(12) United States Patent
Mahmood et al.

(10) Patent No.: US 9,874,624 B2
(45) Date of Patent: Jan. 23, 2018

(54) INTERFERENCE DETECTION AND REJECTION FOR WIDE AREA POSITIONING SYSTEMS USING MAXIMAL RATIO COMBINING IN THE CORRELATION DOMAIN

(71) Applicant: NextNav, LLC, Sunnyvale, CA (US)

(72) Inventors: Mir Hamza Mahmood, Mountain View, CA (US); Arun Raghupathy, Bangalore (IN); Andrew Sendonaris, Los Gatos, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/288,556

(22) Filed: Oct. 7, 2016

(65) Prior Publication Data
US 2017/0250841 A1    Aug. 31, 2017

Related U.S. Application Data

(60) Provisional application No. 62/301,456, filed on Feb. 29, 2016, provisional application No. 62/301,448, filed on Feb. 29, 2016.

(51) Int. Cl.
| | |
|---|---|
| *H04B 1/7115* | (2011.01) |
| *G01S 5/02* | (2010.01) |
| *H04B 17/336* | (2015.01) |
| *H04L 5/00* | (2006.01) |
| *H04L 25/08* | (2006.01) |

(52) U.S. Cl.
CPC .......... *G01S 5/0215* (2013.01); *G01S 5/0252* (2013.01); *H04B 17/336* (2015.01); *H04L 5/006* (2013.01); *H04L 25/08* (2013.01)

(58) Field of Classification Search
USPC ...... 375/227, 150, 260, 132, 316; 455/456.1
See application file for complete search history.

(56) References Cited

U.S. PATENT DOCUMENTS

| | | | | |
|---|---|---|---|---|
| 2005/0041725 A1* | 2/2005 | De Rivaz | ........... | H04B 1/71637 375/150 |
| 2009/0046792 A1* | 2/2009 | Xu | ....... | H04L 25/0204 375/260 |
| 2010/0279707 A1* | 11/2010 | Fischer | ................... | G01S 5/021 455/456.1 |
| 2012/0099503 A1* | 4/2012 | Guo | ......................... | G01S 5/02 370/312 |
| 2016/0156424 A1* | 6/2016 | Mirbagheri | ............... | G01S 1/20 375/227 |
| 2016/0171965 A1* | 6/2016 | Arai | ...................... | H04R 29/00 381/56 |

* cited by examiner

*Primary Examiner* — Eva Puente

(57) ABSTRACT

Interference detection and mitigation using maximal ratio combining in the correlation domain. Systems and methods for interference detection and mitigation using maximal ratio combining in the correlation domain may receive a plurality of copies of a positioning signal, compute a plurality of correlation functions using the received positioning signals; weight the plurality of correlation functions using a plurality of weights that are proportional to the quality of the plurality of correlation functions, and generate a combined correlation function by combining the weighted correlation functions.

20 Claims, 13 Drawing Sheets

INTERFERENCE DETECTION AND REJECTION FOR WIDE AREA POSITIONING SYSTEMS USING MAXIMAL RATIO COMBINING IN THE CORRELATION DOMAIN

TECHNICAL FIELD

This disclosure relates to interference detection and mitigation using maximal ratio combining in the correlation domain.

BACKGROUND

Positioning systems are widely used to estimate a receiver's location using positioning signals that the receiver receives from one or more types of beacons (e.g. terrestrial transmitters or satellites). Positioning signals transmitted from satellites can have relatively low power levels which makes those positioning signals susceptible to interference. By contrast, positioning signals from terrestrial transmitters are often received at a receiver at higher power levels. However, the frequencies used to transmit terrestrial positioning signals are not subject to the same use restrictions as more conventional positioning system signals, since the terrestrial transmitters may operate within, or near, an unlicensed frequency band. Low-power emitters (e.g. consumer devices) operating at or near the same frequency band can be a source of interference. This interference may not have a predictable time and/or frequency pattern.

The presence of interference in the frequency bandwidth of interest is a serious problem for receivers. In time-of-arrival (TOA) positioning systems, this interference can degrade the quality of a position estimate made by the receiver. Additionally, this interference can compromise other aspects of signal acquisition and system time synchronization. Thus, solutions are needed to determine and mitigate interference within a positioning system. Different systems and methods for interference detection and mitigation using maximal ratio combining (MRC) in the correlation domain are described in the disclosure that follows.

DETAILED DESCRIPTION

Presence of interfering signals in a bandwidth of interest is a serious problem faced by wireless systems. If not suppressed, this interference can degrade the quality of a position estimate made by the receiver in time-of-arrival (TOA) positioning systems.

The effects of interference within the positioning system can be mitigated using correlation maximal ratio combining (MRC). In time diverse positioning systems it may be desirable to transmit multiple copies of the transmitted signal (e.g. a positioning signal). The multiple copies of the transmitted signal are received at a receiver. Correlation functions are computed for each of the received signals. These correlation functions are then weighted and coherently combined. Coherent combination is a summation/integration of signals/functions that are in-phase relative to one-another. After performing the weighted coherent combination, the resultant correlation function is passed to a TOA estimation method and/or module. Such an approach provides additional coherence integration gain to combat system distortions.

Systems and methods for interference detection and mitigation using maximal ratio combining in the correlation domain are described below. Attention is initially drawn to examples of systems that may be used.

Figure 1:
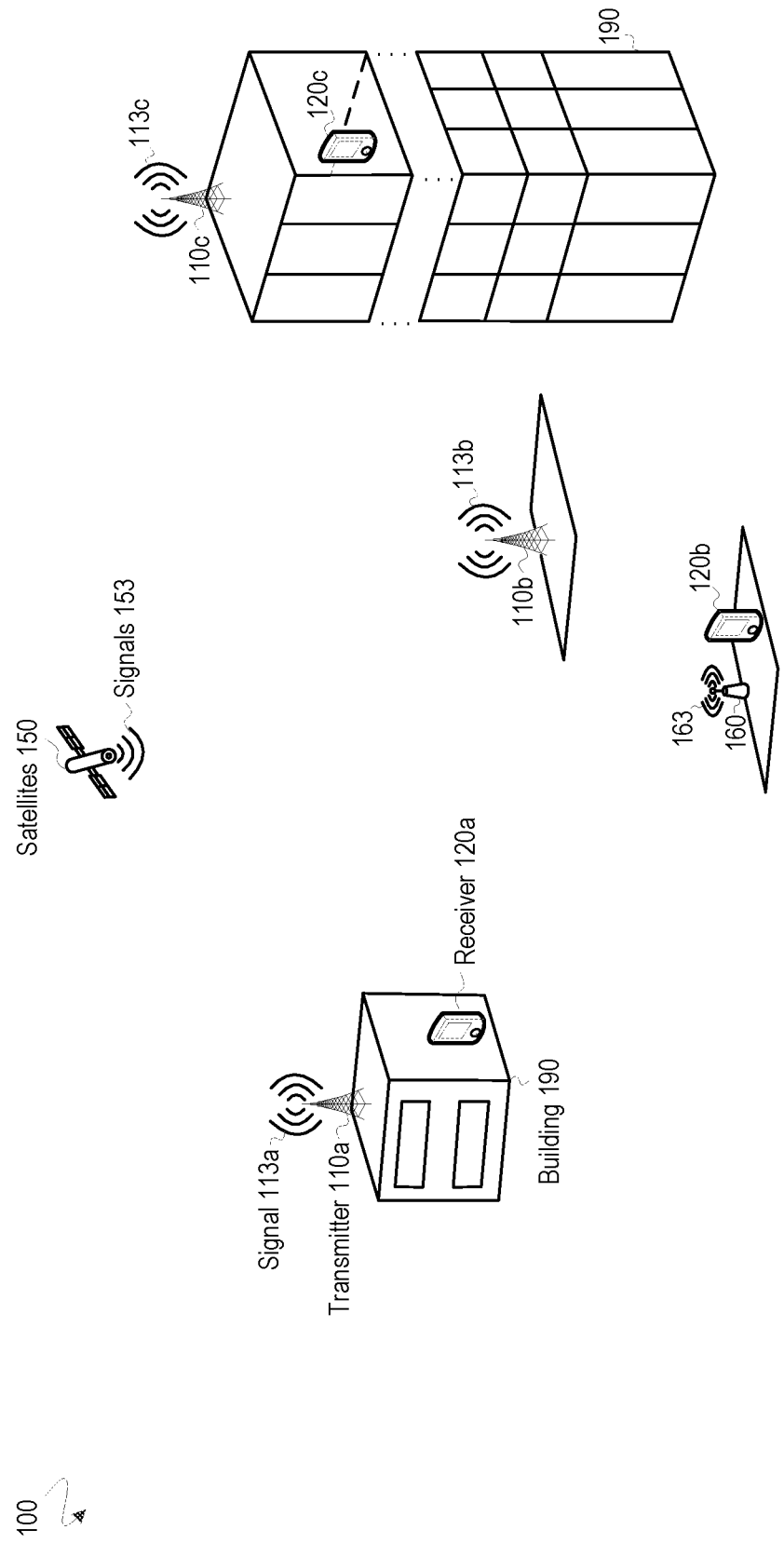
FIG. 1 depicts an operational environment for interference detection and mitigation using maximal ratio combining in the correlation domain.

FIG. 1 depicts an operational environment for interference detection and mitigation using maximal ratio combining in the correlation domain. The operational environment contains a positioning system 100 that includes a network of terrestrial transmitters 110 and any number of receivers 120. The transmitters 110 and the receivers 120 may be located at different altitudes or depths that are inside or outside various natural or manmade structures (e.g. buildings) 190. Signals 113, 153 and 163 are transmitted from the transmitters 110, satellites 150 and a low-power emitter 160 (e.g. a consumer device) using known wireless or wired transmission technologies. The transmitters 110 may transmit the signals 113 using one or more common multiplexing parameters—e.g. time slot, pseudorandom sequence, or frequency offset.

The low-power emitter 160 is positioned near the receiver 120*b*. By way of example, the low-power emitter 160 may be a consumer device operating at or near the pass-band of the receiver 120*b* and the other receivers 120. The interfering signals 163 and the positioning signals 113 are both received at the receiver 120*b*. The presence of interference from the signals 163 is likely to introduce error into TOA's generated at the receiver 120*b*.

Figure 2:
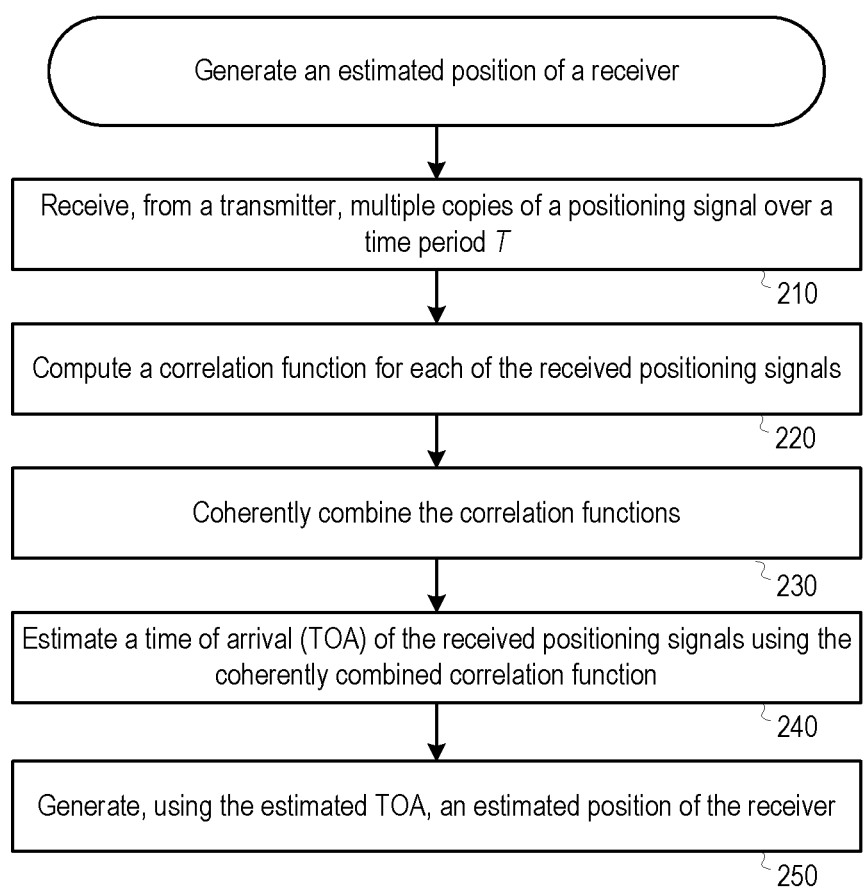
FIG. 2 illustrates a process for generating an estimated position of a receiver.

Attention is now turned to FIG. 2, which illustrates a process for generating an estimated position of the receiver 120b.

The receiver 120b receives multiple copies of a positioning signal 113 over a time period T from a transmitter 110 at step 210. For example, the receiver 120b receives an identical positioning signal 113c transmitted from transmitter 110c every 1 ms for 100 ms. In many TOA positioning systems, a pseudorandom noise (PN) sequence is transmitted multiple times over the air as a pulse train by N number of transmitters. As an example, consider a case where a PN sequence $c_n(t)$ is transmitted I times over the air by the nth transmitter (e.g. the transmitter 110c). In most wireless systems, a pulse shaping transmit filter is used to process the signal before transmitting it over the air. The $i^{th}$ copy of the noiseless pulse shaped signal before transmission from the $n^{th}$ transmitter can be written as, $$x_i^{(n)}(t)=c_n(t)*p(t), i=1,2,\ldots,I \quad \text{(Equation 1),}$$

where p(t) is the impulse response of the pulse shaping filter. For ease of reference, the $i^{th}$ copy of the signal in Equation 1 is referred to as the $i^{th}$ bit transmitted by the $n^{th}$ transmitter.

The wireless channel adds noise in the transmitted signal, along with a complex gain and time delay. Thus, $y_i^{(n)}(t)$ from Equation 2 below denotes the received signal corresponding to $x_i^{(n)}(t)$. Often, the received signal is processed with a matched filter, or any other receiver processing filter. If the impulse response of the receiver processing filter is h(t), the output of the receiver filter with $y_i^{(n)}(t)$ as input can be written as, $$O_i^{(n)}(t)=y_i^{(n)}(t)*h(t) \quad \text{(Equation 2).}$$

At step 220, a correlation function is computed for each of the received positioning signals using the output $O_i^{(n)}(t)$. For a PN sequence based positioning system, in order to estimate the time delay from $n^{th}$ transmitter, the output $O_i^{(n)}(t)$ is correlated with a locally generated copy of the transmitted sequence $c_n(t)$. This operation is often called "de-spreading" in direct sequence spread spectrum based positioning systems.

At step 230, the computed correlation functions for each of the I received signals from the $n^{th}$ transmitter are coherently combined. The correlator output for all $O_i^{(n)}(t)$ i=1, 2, . . . , I is coherently combined to get what is referred to as an integrated correlation function, written as, $$C_n(t)=\Sigma_{i=1}^{I} O_i^{(n)}(t)*c_n(t) \quad \text{(Equation 3).}$$

At step 240, the coherently combined correlation function $C_n(t)$ is used to estimate a TOA of the received positioning signals received from the $n^{th}$ transmitter (e.g. the positioning signals 113c received from the transmitter 110c).

Then, at step 250, an estimated position of the receiver 120b is generated using the estimated TOA (e.g. using a trilateration algorithm, as is known in the art).

Figure 3:
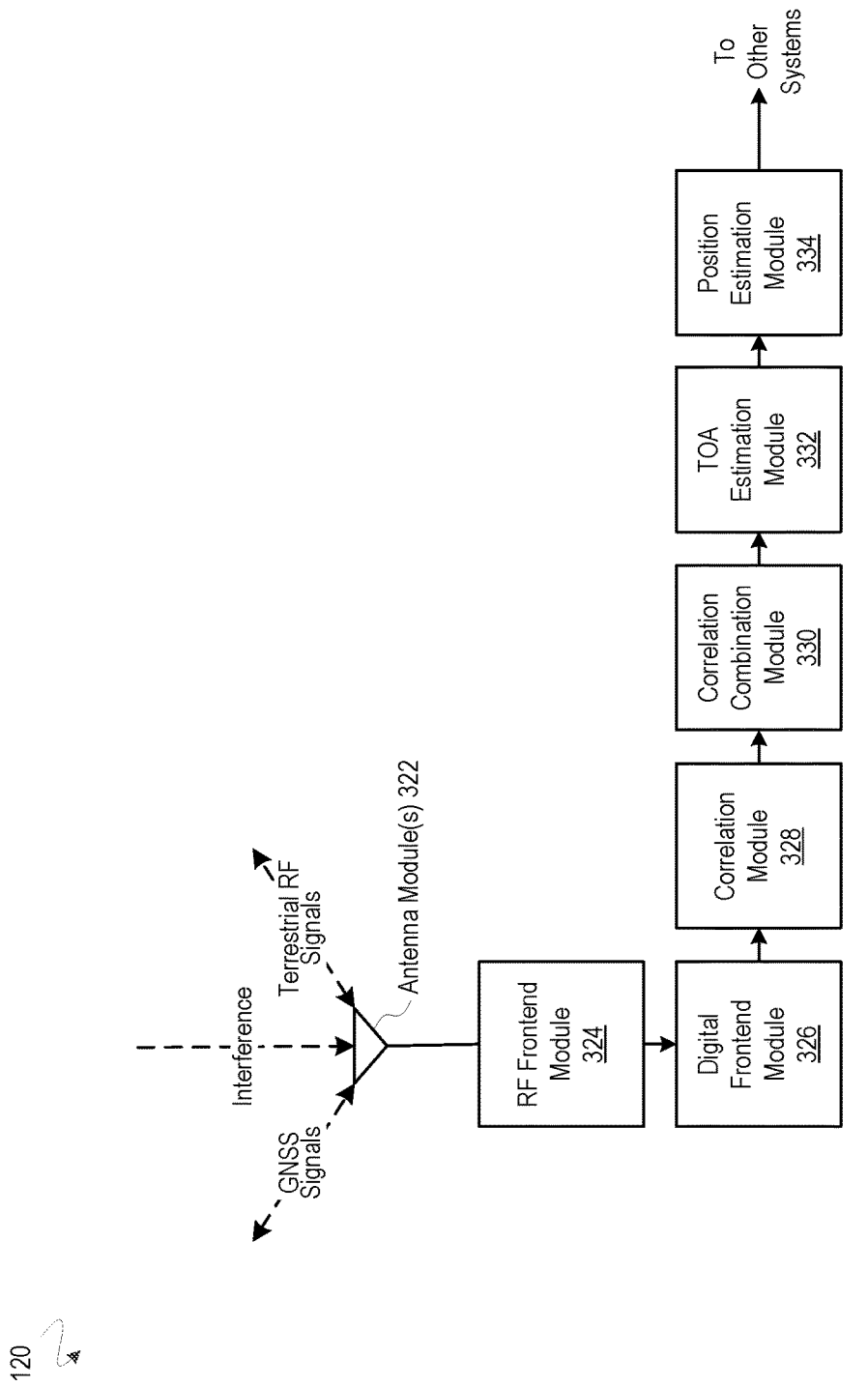
FIG. 3 illustrates a receiver used for receiving positioning signals and generating an estimated position of the receiver.

FIG. 3 illustrates one embodiment of a receiver 120 when it is used for receiving positioning signals and generating an estimated position of the receiver. The receiver 120 includes various modules that are each operable to carry out different steps of FIG. 2. As shown, the modules may include: antenna module(s) 322, an RF frontend module 324 and a digital frontend module 326 which are collectively operable to receive multiple copies of a positioning signal 113 as described at step 210; a correlation module 328 that is operable to compute a correlation function for each of the received positioning signals 113 as described at step 220; a correlation combination module 330 that is operable to coherently combine the correlation functions as described at step 230; a TOA estimation module 332 that is operable to estimate a TOA of the received positioning signal as described at step 240; and a position estimation module 334 that is operable to generate an estimated position of the receiver as described at step 250. As shown, the antenna module(s) 322 are coupled to the RF frontend module 324; the RF frontend module 324 is coupled to the digital frontend module 326; the digital frontend module 326 is coupled to the correlation module 328; the correlation module 328 is coupled to the correlation combination module 330; the correlation combination module 330 is coupled to the TOA estimation module 332; and the TOA estimation module 332 is coupled to the position estimation module 334.

Interference Detection and Mitigation Using Maximal Ratio Combining (MRC) in the Correlation Domain In order to mitigate interference introduced by in-band low-power (or other) emitters, accumulation/combining of correlation functions, as shown in Equation 3, should not be agnostic to the quality of the correlation functions, $O_i^{(n)}(t)$ *$c_n(t)$, which are being accumulated. In the context of interference rejection, it is possible to weigh the correlation functions according to some metric before coherently combining them (e.g. via the summation of Equation 3). If a metric is computed that reflects the quality of the correlation function, then weighting the correlation functions using that metric before coherent combining the correlation functions will suppress the correlation functions that are corrupted by interference.

Denoting the weight metric for the $i^{th}$ correlation function with $\lambda_i$, Equation 3 is modified to perform a weighted coherent combination, thus producing an algorithm for MRC interference rejection in the correlation domain as follows:

$$C_n(t)=\Sigma_{i=1}^{I} \lambda_i O_i^{(n)}(t)*c_n(t) \quad \text{(Equation 4).}$$

The weighting metric $\lambda_i$ used can be anything that is a representation of the quality of the $i^{th}$ correlation function.

Figure 4:
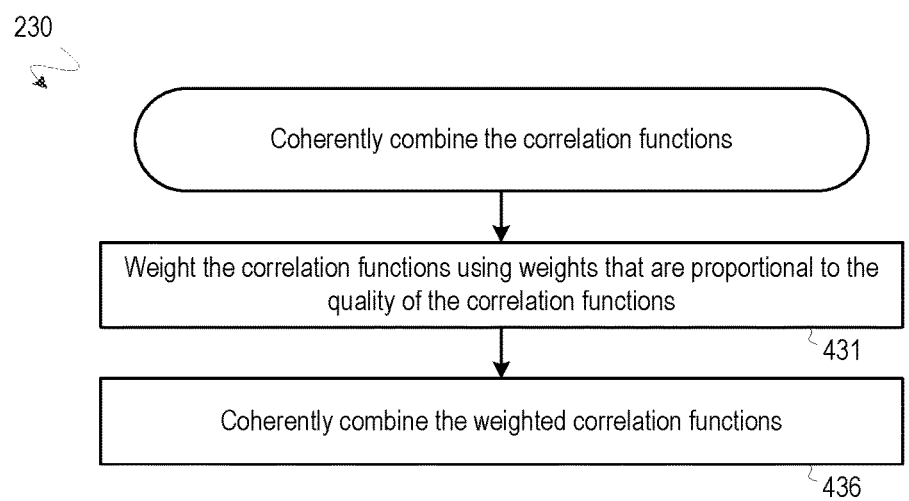
FIG. 4 illustrates a process for interference detection and mitigation using maximal ratio combining in the correlation domain.

This weighted coherent combination of the correlation functions can be achieved using a process for interference detection and mitigation using maximal ratio combining in the correlation domain shown in FIG. 4. At step 431 of FIG. 4, the correlation functions (which were computed at step 220 as shown in FIG. 2) are weighted using weights that are proportional to the quality of the correlation functions. At step 436, the weighted correlation functions are coherently combined. The determination of these weights is discussed later with reference to FIG. 6 and FIG. 7.

Figure 5:
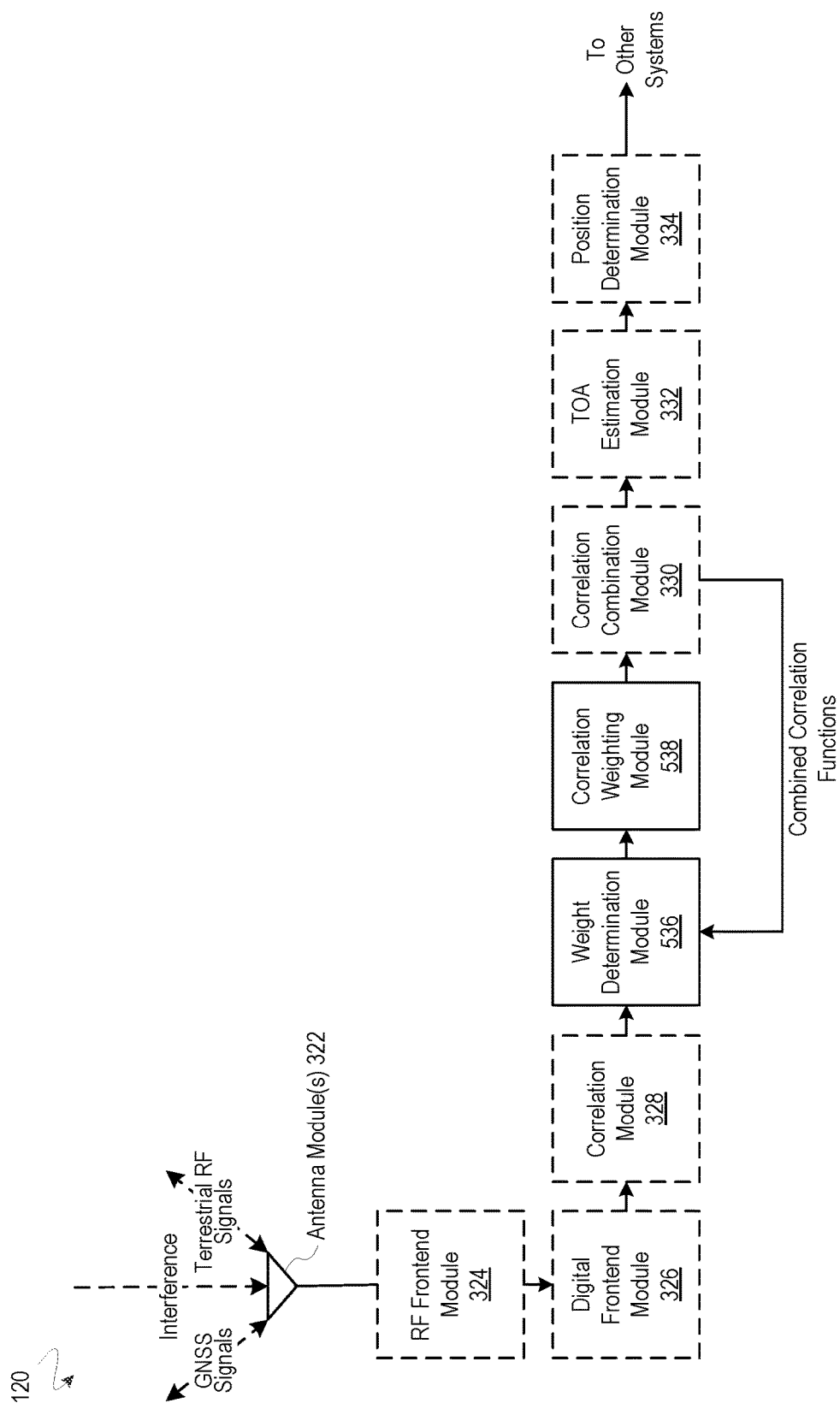
FIG. 5 provides additional details of a receiver for implementing interference detection and mitigation using maximal ratio combining in the correlation domain.

Additional details of a receiver 120 implementing interference detection and mitigation using maximal ratio combining in the correlation domain are provided in FIG. 5, which shows a module topology of the receiver 120 from FIG. 3 that has been modified in order to carry out the steps of performing MRC in the correlation domain. In addition to the modules 322 through 334 discussed earlier, the receiver 120 of FIG. 5 includes a weight determination module 536 and a correlation weighting module 538 that are collectively operable to weight the correlation functions using weights that are proportional to the quality of the correlation functions, as was described at step 431. The correlation module 328 is coupled to the weight determination module 536; the weight determination module 536 is coupled to the correlation weighting module 538; and the correlation weighting module 538 is coupled to the correlation combination module 330. In one embodiment, the correlation combination module 330 is additionally coupled to the weight determination module 536. This embodiment is discussed later with reference to FIG. 7.

As discussed later with reference to FIG. 14, the weight determination module 536 may be coupled to the position determination module 334 in order to transmit determined correlation function weights to the position determination module 334. In one embodiment, the correlation function weights are used by the position determination module 334 to generate pseudorange weights for use in the positioning domain.

Figure 6:
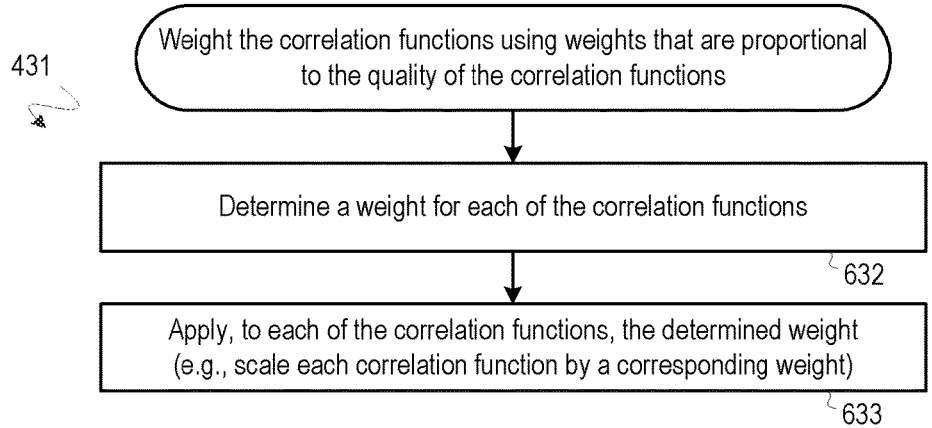
FIG. 6 illustrates a process for weighting correlation functions using weights that are proportional to the quality of the correlation function.
Figure 8:
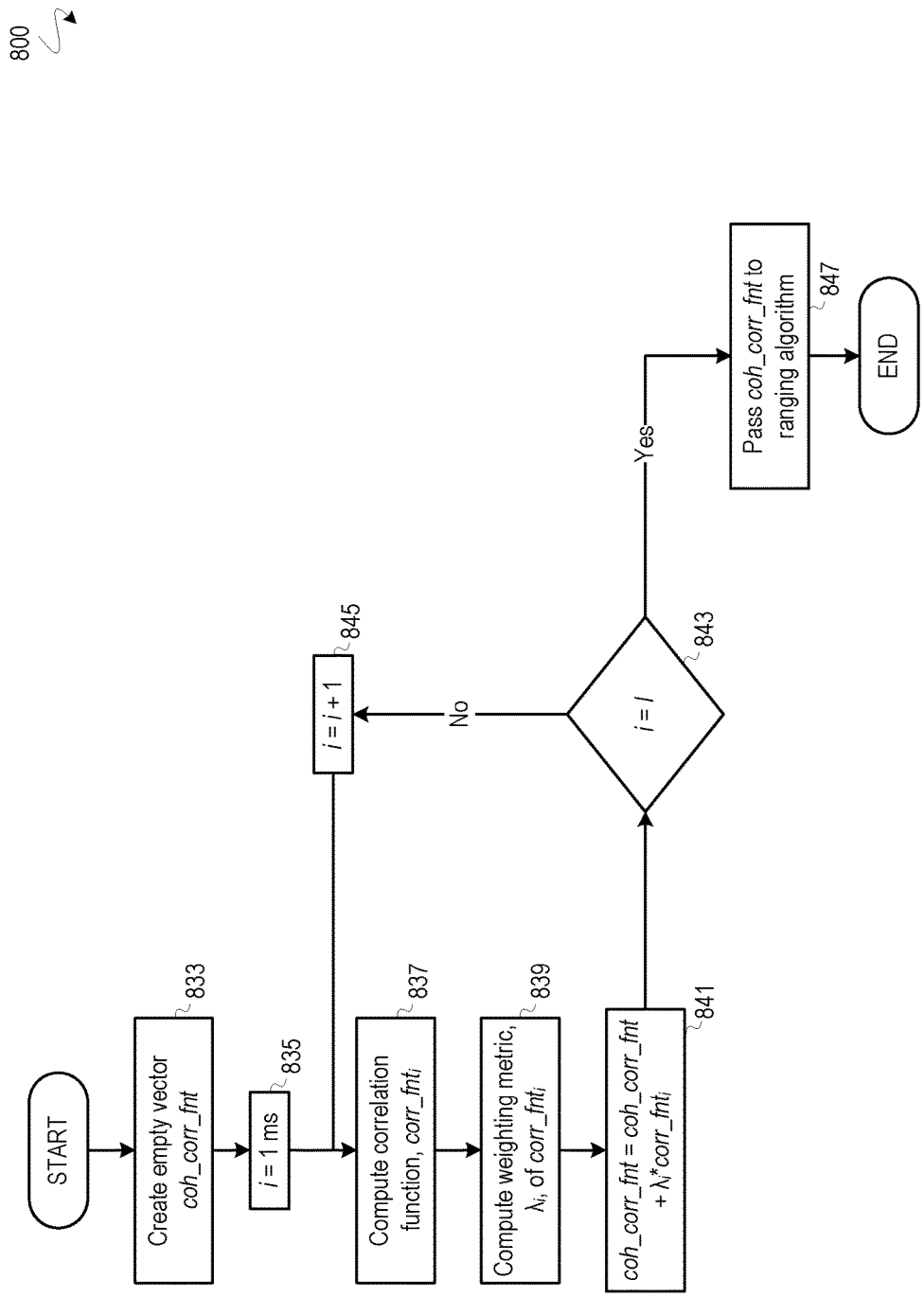
FIG. 8 illustrates one embodiment of a correlation domain-based maximal ratio combination using a weighting metric.

Attention is now turned to FIG. 6, which illustrates a process for weighting the correlation functions using weights that are proportional to the quality of the correlation function. The steps of FIG. 6 could occur as one embodiment of step 431 of FIG. 4. The steps include: determining a weight for each of the correlation functions (step 632); and applying, to each of the correlation functions, the determined weight (step 633). Functional details of implementing the steps of FIG. 6 are discussed below with reference to FIG. 8, which illustrates one embodiment of a correlation domain-based maximal ratio combination using a weighting metric. At step 833, an empty vector coh_corr_fnt is created. In this example a positioning signal was transmitted every 1 ms, I times, resulting in a total of I correlation functions to be weighted and coherently combined. At step 835, an index variable i is initialized to 1 ms. At step 837, a correlation function corr_fnt$_i$ is computed using a received positioning signal. Then, at step 839, a weighing metric $\lambda_i$ is computed using the correlation function corr_fnt$_i$. Computation of the weighting metric $\lambda_i$ is discussed later in more detail with reference to FIG. 11 and FIG. 12. At step 841, the correlation function corr_fnt$_i$ is weighted (e.g. scaled) by the computed weight $\lambda_i$ and the weighted result is coherently combined with the coh_corr_fnt vector. At step 843, the index i is tested against the predetermined limit I. If i does not yet equal I (e.g. there are more correlation functions to weight) flow proceeds to step 845, where i is incremented, and then the flow continues back to step 837. Correlation functions are computed for received positioning signals and the results are weighted and coherently combined until i=I. When the index variable i reaches the limit I, flow continues to step 847, where the vector coh_corr_fnt, which contains the coherently combined correlation function, is passed on to a ranging algorithm.

In a low signal to noise ratio (SNR) situation, even after de-spreading, a peak might be embedded in noise and bit level correlation function may appear noise-like. Thus, some integration (e.g. summation) may be required before applying the MRC weighting algorithm.

Figure 7:
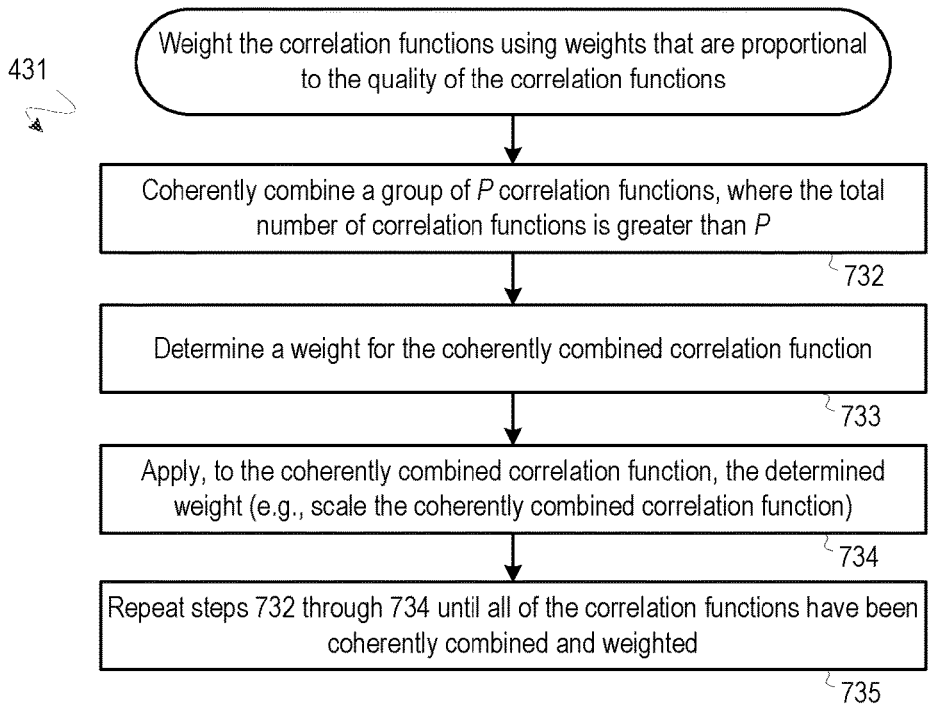
FIG. 7 illustrates a process for weighting correlation functions using weights that are proportional to the quality of the correlation function.

Details of another embodiment of step 431 are shown in FIG. 7, which illustrates a process for weighting the correlation functions using weights that are proportional to the quality of the correlation function, where each group of coherently combined correlation functions is used to determine a weight. In one embodiment, P correlation functions are first coherently combined before conducting the step of weight determination. At step 732, a group of P correlation functions are coherently combined, where the total number of correlation functions is greater than P. At step 733, a weight is determined for the coherently combined correlation function that was generated by coherently combining the P correlation functions. At step 734, the determined weight is applied to the coherently combined correlation function. Then, at step 735, the steps 732 through 734 are repeated until all of the computed correlation functions have been coherently combined and weighted. Selection of the value P is discussed later. The weighted coherently combined correlation functions created by carrying out steps 732 through 734 are themselves then coherently combined as was described with reference to step 436 of FIG. 4.

The steps of FIG. 7, conducted for low SNR scenarios as described, can be realized by modifying Equation 4 as shown below:

$$C_n(t) = \sum_{i=1}^{I/P} \lambda_i \sum_{j=(i-1)P+1}^{iP} O_j^{(n)}(t)^* c_n(t) \qquad \text{(Equation 5)}.$$

For simplicity, it is assumed in Equation 5 that I is a multiple of P, such that the total number of correlation functions received I is evenly divisible by the group size of P correlation functions. This simplified embodiment is described below with reference to FIG. 9. Another embodiment, without such assumptions, is described below with reference to FIG. 10. For some positioning systems, a specific value for P may be desirable because of the design of PN codes uses in such systems. Therefore, the choice of P should depend not only the SNR available, but also the design of PN codes used in the positioning system. I represents the total number of identical positioning (or PRN) signals transmitted by a given transmitter. Different factors can drive the choice of I (or the 'slot' size). Since I number of PRN signals are coherently integrated, the choice of I will dictate the coherent integration gain that will be available in the system. Thus, I may be chosen as a system design parameter and not necessarily with regards to interference mitigation techniques.

Figure 9:
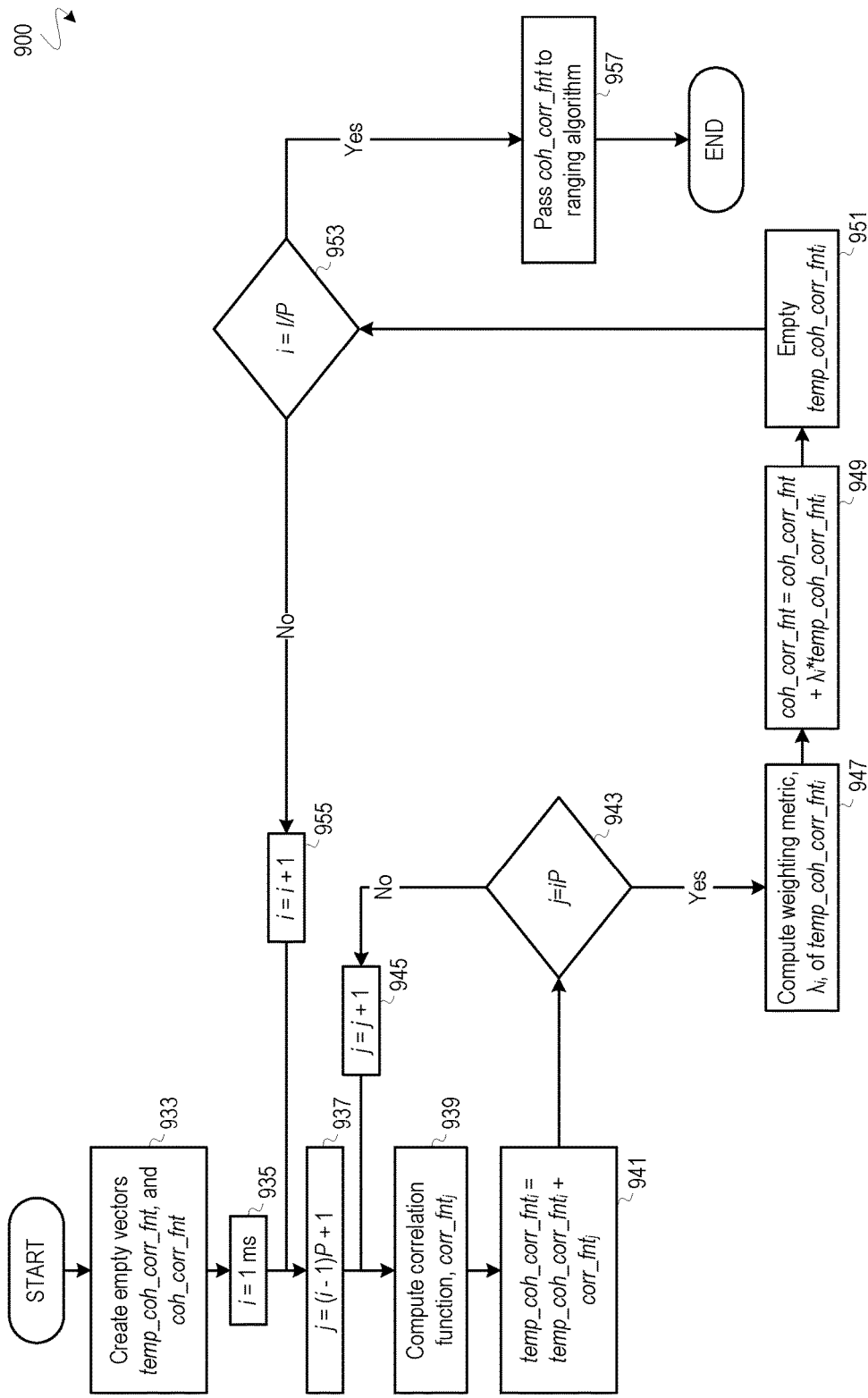
FIG. 9 illustrates another embodiment of a correlation domain-based maximal ratio combination using a weighting metric.

FIG. 9 illustrates one embodiment of a correlation domain-based maximal ratio combination using a weighting metric, where groups of correlation functions are first coherently combined before a weight for each group is determined. At step 933, two empty vectors, temp_coh_corr_fnt and coh_corr_fnt are created. The vector coh_corr_fnt is used to accumulate and store the results of the entirety of coherently combined correlation functions. The vector temp_coh_corr_fnt is used to store intermediate results of a sub-set of coherently combined correlation functions. This intermediate result is used to generate a weighting metric, as is described in more detail later. At step 935, an index variable i is initialized to 1 ms, and at step 937, an index variable j is initialized to a (I−1)*P+1, where P is a predetermined value. At step 939 a correlation function corr_fnt$_j$ is calculated using received positioning signals. At step 941, the correlation function corr_fnt$_j$ is coherently combined with the temp_coh_corr_fnt$_i$ vector. At step 943, the value of the index variable j is tested against the product of iP. If j does not yet equal the product of iP, flow continues to step 945, where j is incremented before the flow proceeds back to step 939. Correlation functions of received positioning signals are computed and coherently combined until j equals the product of iP. When the value of j reaches the product of iP at step 943, flow continues to step 947, where a weighting metric $\lambda_i$ is computed using the intermediate results of the temp_coh_corr_fnt$_i$ vector. At step 949, the coherently combined correlation function temp_coh_corr_fnt$_i$ is weighted by the computed weight $\lambda_i$ and the weighted result is coherently combined with the values stored within the coh_corr_fnt vector. The vector temp_coh_corr_fnt$_i$ is then emptied at step 951. At step 953 the index i is tested against the quotient of I/P. If the index i does not yet equal I/P, i is incremented at step 955 before flow returns to step 937. When the value of index i reaches the value of the quotient of I/P at step 953, flow proceeds to step 957, where the coherently combined correlation function, coh_corr_fnt, is passed to a ranging algorithm.

Figure 10:
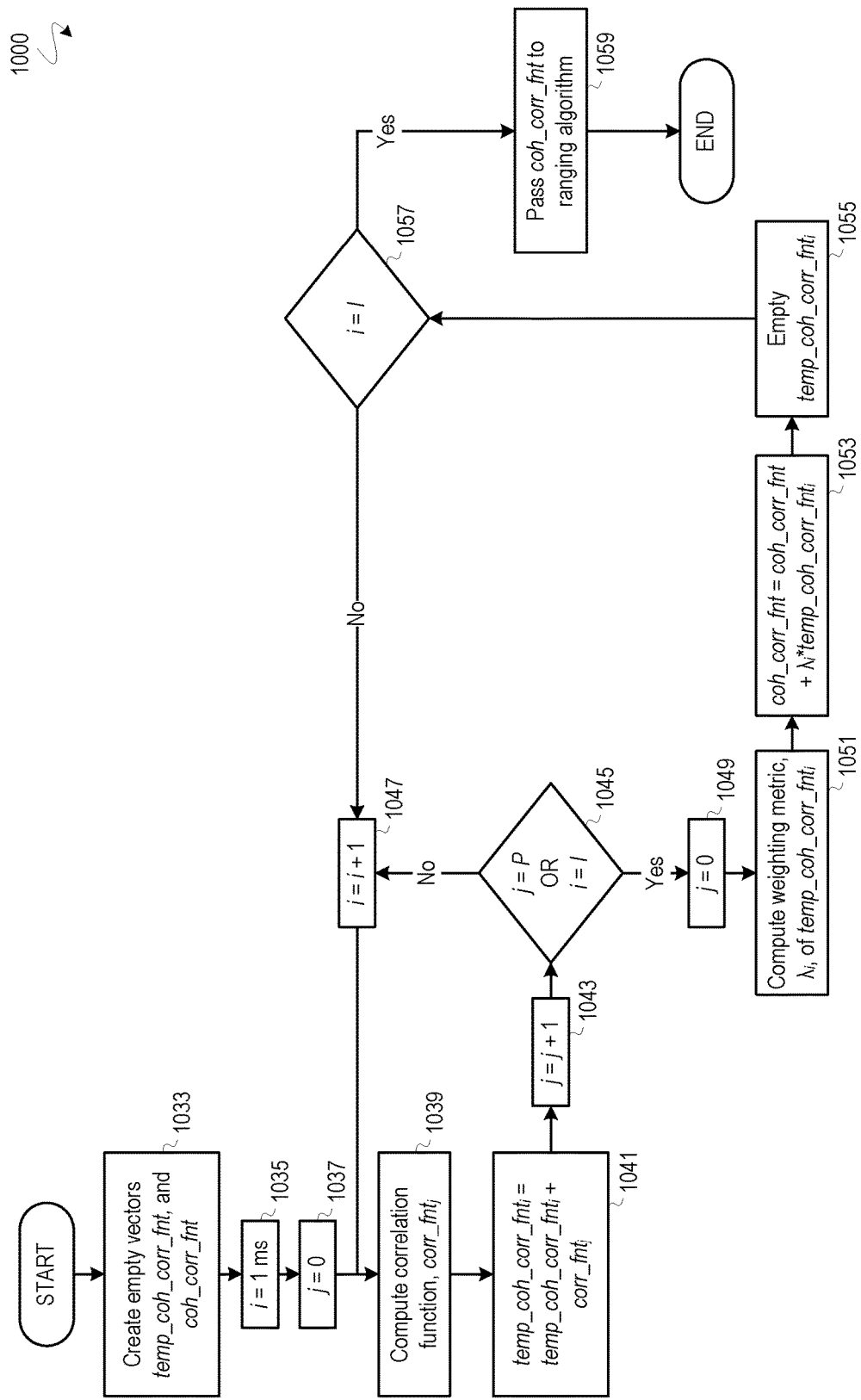
FIG. 10 illustrates yet another embodiment of a correlation domain-based maximal ratio combination using a weighting metric.

FIG. 10 illustrates another embodiment of a correlation domain-based maximal ratio combination using a weighting metric, where groups of correlation functions are first coherently combined before a weight for each group is determined. At step 1033, two empty vectors, temp_coh_corr_fnt and coh_corr_fnt are created. The vector coh_corr_fnt is used to accumulate and store the results of the entirety of coherently combined correlation functions. The vector temp_coh_corr_fnt is used to store intermediate results of a sub-set of coherently combined correlation functions. This intermediate result is used while generating a weighting metric, as is described in more detail later. At step 1035, an index variable i is initialized to 1 ms, and at step 1037, an index variable j is initialized to a 0. At step 1039, a correlation function corr_fnt$_j$ is calculated using received positioning signals (not shown). At step 1041, the correlation function corr_fnt$_j$ is coherently combined with the temp_coh_corr_fnt$_i$ vector. At step 1043, the index variable j is incremented, and then at step 1045, j is tested against the predetermined value P. At step 1045, the index variable i is tested against the predetermined value I. If j does not yet equal P, and i does not yet equal I, flow continues to step 1047, where i is incremented before the flow proceeds back to step 1039. The correlation functions of received positioning signals are computed and coherently combined until the value of index i or j meet the limits specified in step 1045. When the value of the index j reaches P, or the value of index i reaches I, flow continues to step 1049, where the index variable j is re-initialized to a value of 0. At step 1051, a weighting metric $\lambda_i$ is computed using the intermediate coherently combined correlation function temp_coh_corr_fnt$_i$. At step 1053, the coherently combined correlation function temp_coh_corr_fnt$_i$ is weighted by the computed weight $\lambda_i$ and the weighted result is coherently combined with the values stored within the coh_corr_fnt vector. The vector temp_coh_corr_fnt$_i$ is then emptied at step 1055. At step 1057, the value of the index variable i is tested against the predetermined value I. If i does not yet equal I, flow continues back to step 1047, where the value of i is incremented. If the value of i has reached I, the vector coh_corr_fnt is passed along to a ranging algorithm at step 1059.

The weighting metric used in the preceding figures could be any metric that reflects the quality of a single correlation function, or the quality of a group of coherently combined correlation functions. Below, two example embodiments of a weighting metric are presented. As is known in the art, presence of any signal other than the PN sequence itself contributes to the side-lobes after de-spreading. Thus, one possible metric that may be used in the correlation domain can be computed as the main-lobe to peak side-lobe ratio (MPSR).

Figure 11:
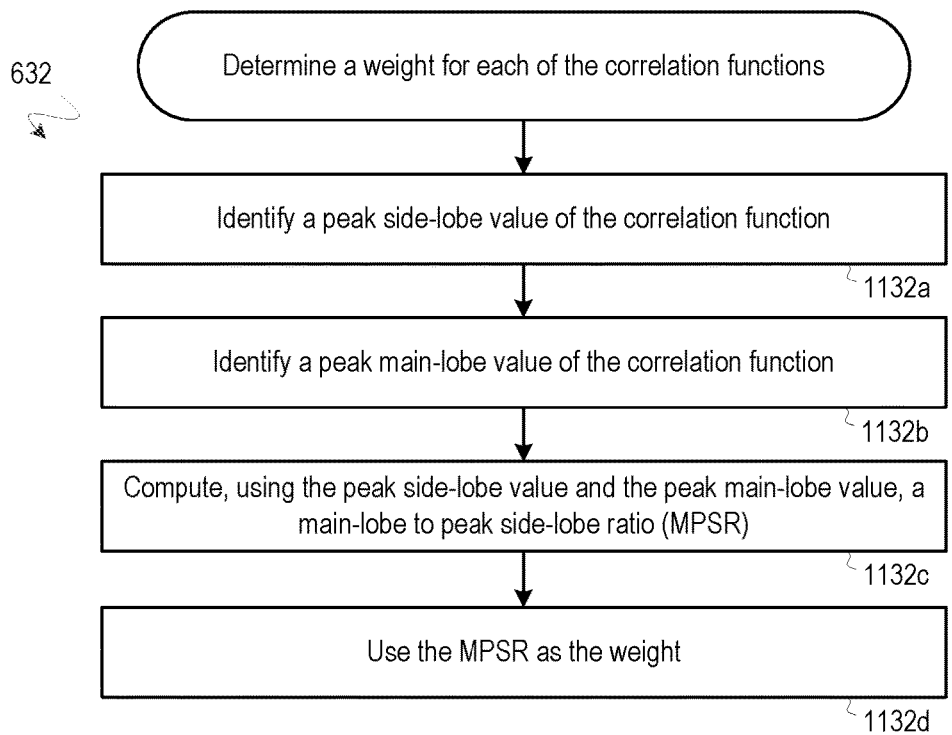
FIG. 11 illustrates a process for determining a weight for each of the correlation functions.

FIG. 11 illustrates a process for determining a weight for each of the correlation functions, where the weight is proportional to a main-lobe to peak side-lobe ratio. The steps of the process could occur at step 632 of FIG. 11 and include: identifying a peak side-lobe value of the correlation function (step 1132a); identifying a peak main-lobe value of the correlation function (step 1132b); computing, using the peak side-lobe value and the peak main-lobe value, a main-lobe to peak side-lobe ratio (MPSR) (step 1132c); and using the MPSR as the weight (step 1132d). The steps of determining an MPSR is known in the art.

Figure 12:
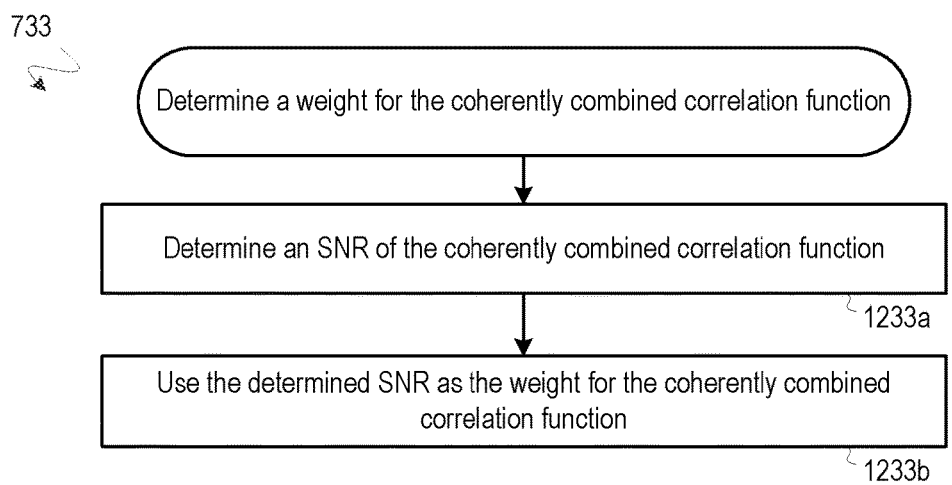
FIG. 12 illustrates a process for determining a weight for a coherently combined correlation function.

FIG. 12 illustrates a process for determining a weight for a coherently combined correlation function, where the weight is proportional to an SNR. The steps of the process could occur at step 733 of FIG. 7 and include: determining a signal-to-noise-ratio (SNR) of the coherently combined correlation function (step 1233a); and using the determined SNR as the weight for the coherently combined correlation function (step 1233b). Determining an SNR can occur using techniques that are known in the art.

The weighting metric used can be anything that is a representation of the quality of the correlation function. Main-lobe to peak side-lobe ratio (as an example) reflects the quality of the correlation functions where the main-lobe's peak can be considered as the representation of the signal, while the side-lobes can be considered as the representation of interference plus noise. In some sense, main peak to side-lobe ratio can be viewed as SNR as well. Therefore, while MPSR and SNR are a suitable metrics, any weighting scheme that reflects the quality of the correlation function can be used for weight computations.

Interference mitigation techniques described herein improve positioning system performance after a receiver has acquired a transmitter and is tracking that transmitter, thereby improving the quality of TOA estimates. However, these techniques additionally improve positioning system performance during the acquisition stage. For instance, in some scenarios, the positioning system may be impacted by a strong interferer, causing receivers to fail to acquire a transmitter of the positioning system. However, the positioning system's acquisition process runs in a fashion similar to one described herein, in that a PN code is transmitted multiple times, correlation functions are computed and coherently combined by a receiver, and the SNR of the resulting coherently combined correlation function is compared against a threshold. If the SNR passes the threshold test, the transmitter is said to be acquired and the tracking stage begins. Using the techniques described herein, PN codes which are corrupted by the strong interferer can be suppressed, thus making it more likely that the resultant SNR will pass the threshold.

Pseudorange Weighting for Improvements in the Positioning Domain

Interference detection and rejection in the correlation domain as described above ultimately improves TOA estimates of received positioning signals in the ranging domain. Aspects of these techniques may also be used to mitigate the effect of interference in the positioning domain.

Often, in TOA based positioning systems, correlation functions of multiple bits are combined into an integrated correlation function (as shown in Equation 3) to increase the integration gain. However, if it is determined that interference present in the system cannot be mitigated in the ranging domain, in some circumstances the negative effects of interference can be suppressed in the positioning domain.

In one embodiment, an interference presence metric $\beta_n$ corresponding to an $n^{th}$ transmitter is generated using signal metrics such as SNR and MPSR. If the $n^{th}$ transmitter is under heavy influence of external interference, the interference presence metric $\beta_n$ is used by a trilateration algorithm to deemphasize the influence of pseudorange measurements from the $n^{th}$ transmitter when generating an estimated position of the receiver.

As external interference may be time varying, there is a likelihood that the $n^{th}$ transmitter that is being influenced by external interference while transmitting a first pulse train may no longer be influenced by the external interference while transmitting a subsequent pulse train. Thus, a more reliable pseudorange measurement may be obtained from subsequent transmissions from the $n^{th}$ transmitter.

In one embodiment, the signal metrics used to determine the interference presence metric $\beta_n$ are determined using one or more of the I correlation functions corresponding to the $n^{th}$ transmitter. As was discussed earlier, a PN sequence $c_n(t)$ is transmitted I times over the air by the $n^{th}$ transmitter resulting in I correlation functions. As each PN sequence is received, a correlation function is calculated and the correlation function is used to calculate a weight. However, rather than explicitly mitigating the interference by weighting the correlation function with the calculated weight, the calculated correlation functions are coherently integrated with a unity weight. The calculated weights can then be considered to be a representation of the received signal's SNR.

Additional information may be considered as part of developing the interference presence metric $\beta$, including signal-to-interference-plus-noise ratio (SINR) in a time slot, interference-to-noise ratio (INR) in a time slot, the number of transmitters 'visible' to the receiver and MPSR. Pseudorange weighting in the positioning domain may be used in conjunction with any of the interference detection and mitigation techniques described above.

Figure 13:
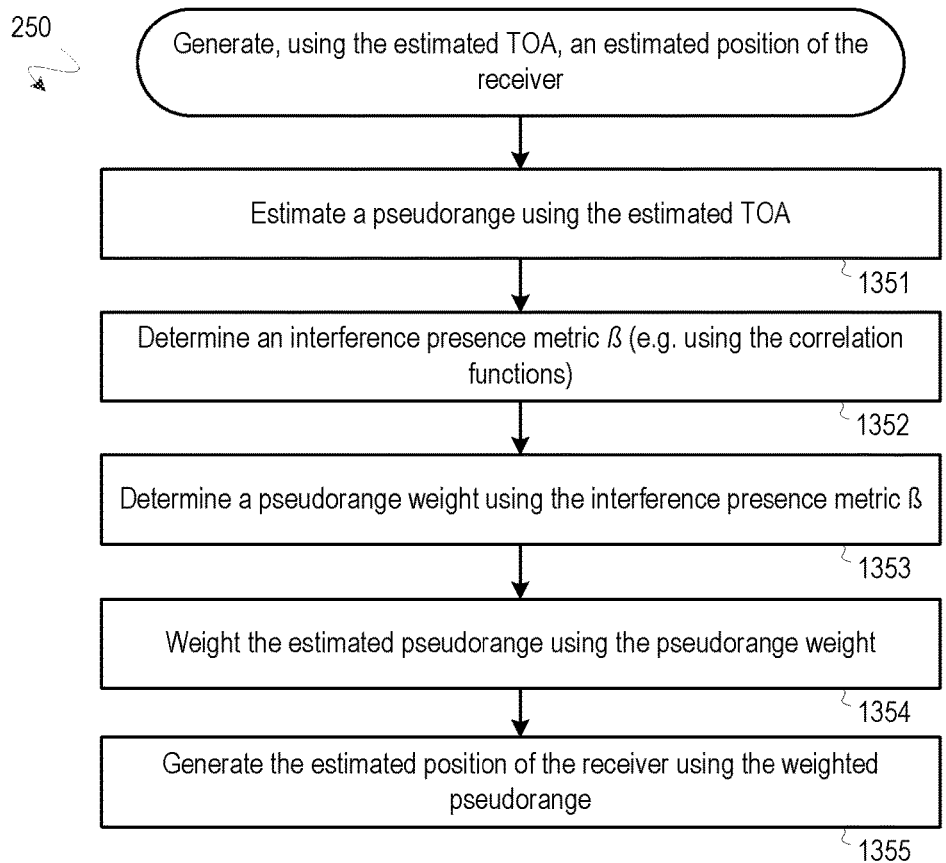
FIG. 13 illustrates a process for generating an estimated position of the receiver.

Attention is now drawn to FIG. 13, which illustrates a process for generating, using the estimated TOA, an estimated position of the receiver. The steps of this process could occur at step 250 of FIG. 2. At step 1351, a pseudorange is estimated using the estimated TOA that was generated at step 240 of FIG. 2. Then, at step 1352, an interference presence metric $\beta$ is determined (e.g. using the correlation functions that were generated at step 220 of FIG. 2). The determination of the interference presence metric $\beta$ is discussed in more detail with reference to FIG. 14 and FIG. 15. At step 1353, a weight is determined using the interference presence metric $\beta$. In one embodiment, the determined weight is proportional to the inference presence metric $\beta$. In another embodiment, the determined weight is inversely proportional to the inference presence metric $\beta$. At step 1354, the estimated pseudorange is weighted using the pseudorange weight, and at step 1355, the estimated position of the receiver is estimated using the weighted pseudorange.

The pseudorange weight determines the contribution that the estimated pseudorange makes when the estimated position of the receiver is generated at step 1355 (e.g. using a trilateration algorithm). A greater weight applied to the estimated pseudorange will increase the contribution of the weighted pseudorange to the estimated position, while a lesser weight applied to the estimated pseudorange will decrease the contribution of the estimated pseudorange to the estimated position.

Figure 14:
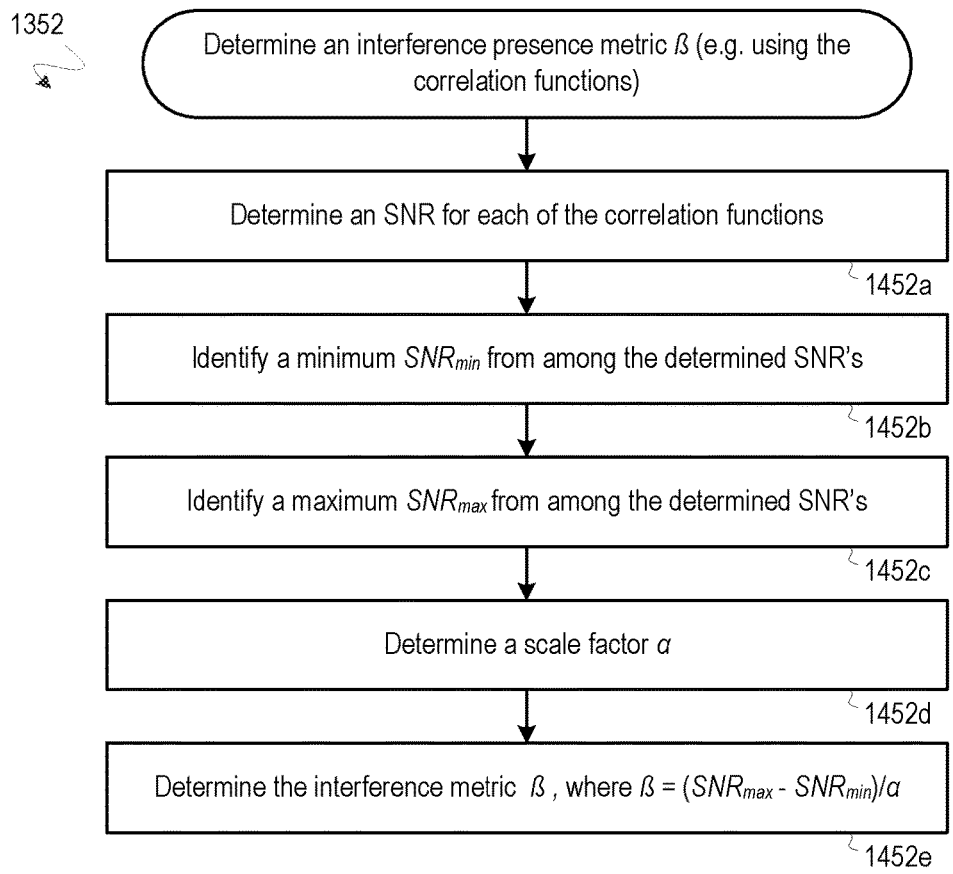
FIG. 14 illustrates a process for determining an interference presence metric.

FIG. 14 illustrates a process for determining an interference presence metric $\beta$. At step 1452a, an SNR (or other metric that is proportional to the quality of the correlation function, such as MPSR) is determined for each of the correlation functions. At step 1452b, a minimum $SNR_{min}$ is identified from among the determined SNR's. $SNR_{min}$ can be considered to represent the received positioning signal's INR. At step 1452c, a maximum $SNR_{max}$ is identified from among the determined SNR's. Then, at step 1452d, a scale factor $\alpha$ is determined. Details of determining the scale factor $\alpha$ are discussed later with reference to FIG. 15. At step 1452e, the interference metric $\beta$ is determined using the following equation, $$\beta = \frac{SNR_{max} - SNR_{min}}{\alpha}. \quad \text{(Equation 6)}$$

Equation 6 assumes that the receiver is not receiving a very weak signal. Thus, if the signal is received and processed without interference, the received signal may result in a correlation function with significantly higher SNR than a received signal when interference is present.

In another embodiment, a variance var(SNR) is computed using the SNR's determined at step 1452a. The SNR variance var(SNR) is then used to determine the interference metric $\beta$, as shown in the following equation, $$\beta = \frac{\alpha}{\text{var}(SNR_i)}. \quad \text{(Equation 7)}$$

SNR values in a particular time slot may vary significantly due to: a) the received positioning signal is of a very low power and is under the noise floor, and b) some of the PN sequence transmissions within the time slot are corrupted by interference and therefore they have a low SNR whereas other PN sequence transmissions not impacted by interference have a high SNR.

Figure 15:
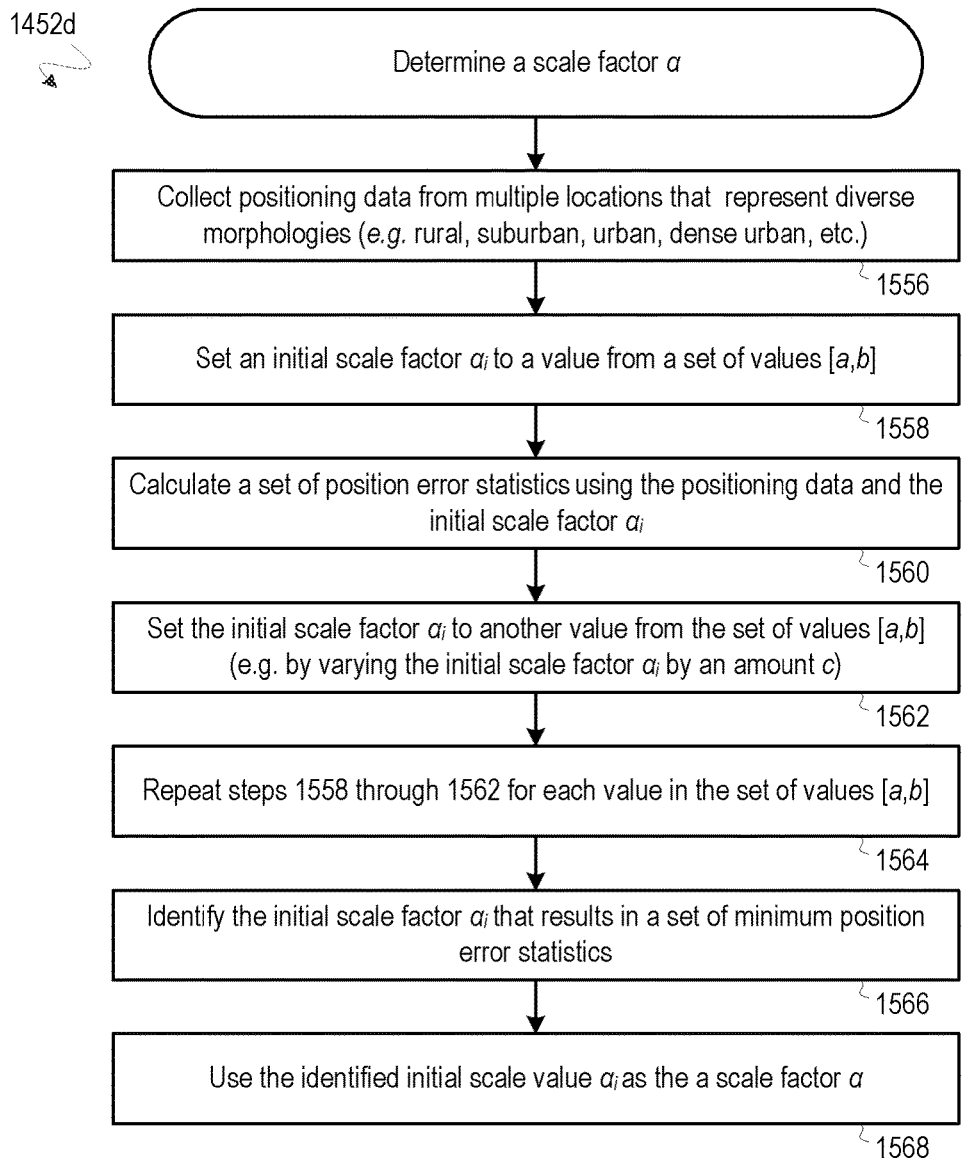
FIG. 15 illustrates a process for determining a scale factor used when generating a pseudorange weight.

Attention is now turned to FIG. 15, which illustrates a process for determining a scale factor $\alpha$ used for determining the interference metric $\beta$. At step 1556, positioning data is collected from multiple locations. These locations are selected to represent diverse morphologies such as rural, suburban, urban, dense urban, or other morphologies. At step 1558, an initial scale factor value $\alpha_i$ is selected from a set of values (or a range of values) [a,b]. In one embodiment, a is a minimum initial scale factor, b is a maximum scale factor, and the interval between selected initial scale factor values $\alpha_i$ is quantized using some step size c. At step 1560, a set of position error statistics are calculated using the collected positioning data and the initial scale factor $\alpha_i$. In one embodiment, for each known position of a receiver, an estimated position of the receiver is calculated using pseudorange weights generated using an interference metric $\beta$ that was determined using the initial scale factor $\alpha_i$. The known position of the receiver and the estimated position of the receiver are then used to calculate a set of position error statistics. At step 1562, the initial scale factor $\alpha_i$ is set to another value from the set of values [a,b] (e.g. by varying the initial scale factor $\alpha_i$ by an amount c). At step 1564, the steps 1558 through 1562 are repeated for each other value in the set of values [a,b]. At step 1566, the initial scale value $\alpha_i$ that resulted in a set of minimum position error statistics is identified (e.g. the initial scale value $\alpha_i$ that was used to generate a pseudorange weight which resulted in an estimated position of the receiver that is closest to the known position of the receiver). At step 1568, the identified initial scale value $\alpha_i$ is used as the scale factor $\alpha$.

Additional Embodiments

In situations where there are shorter dwells (e.g. when small length positioning signals are transmitted), rejecting the interference corrupted signal may not be the best approach. Once completely rejected, not enough 'clean' signal will be left to achieve a coherent integration gain that is required for further processing. An example may be a scenario where a short preamble message is used for synchronization purposes, which can also be severely corrupted in the presence of interference. MRC based techniques are used in such situations. If, however, longer preamble message is employed, SNR may be improved if the interference corrupted signal is completely rejected.

Although most TOA based positioning systems can track positioning signals that have a low SINR, it is difficult to acquire such signals. In order to acquire as many transmitters as possible within the limited resources of a receiver, in one embodiment, shorter acquisition dwells may be employed. Therefore, interference mitigation techniques such as MRC as described above improve signal acquisition while allowing the receiver to work with small acquisition dwell.

In yet another embodiment, if the structure of the interfering signal is known, it can be estimated and subtracted from the received signal in a successive interference cancellation (SIC) fashion. Then the resulting interference cancelled signal can be fed to the correlation module and position determination module for further processing.

Other Aspects

Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform or are operable to perform different method steps/stages disclosed herein are also contemplated, where the modules are implemented using one or more machines listed herein or other suitable hardware.

In one embodiment, one or more systems include: antenna module(s), an RF frontend module and a digital frontend module which are collectively operable to receive multiple copies of a positioning signal; a correlation module that is operable to compute a correlation function for each of the received positioning signals; a correlation combination module that is operable to coherently combine the correlation functions; and processor module(s) that are operable to estimate a TOA of the received positioning signals as described at step. In one embodiment, the antenna module(s) are coupled to the RF frontend module; the RF frontend module is coupled to the digital frontend module; the digital frontend module is coupled to the correlation module; the correlation module is coupled to the correlation combination module; and the correlation combination module is coupled to the processor module(s).

The one or more systems may further or alternatively include: a weight determination module and a correlation weighting module which are collectively operable to weight the correlation functions using weights that are proportional to the quality of the correlation functions; and a correlation combination module that is operable to coherently combine the weighted correlation functions. In one embodiment, the correlation module is coupled to the weight determination module; the weight determination module is coupled to the correlation weighting module; the correlation weighting module is coupled to the correlation combination module; and the correlation combination module is coupled to the processor module(s). In one embodiment, the correlation combination module is additionally coupled to the weight determination module.

When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems (e.g., satellites, other transmitters, receivers, a server); RF front end module(s) with circuitry components (e.g., analog/digital logic and power circuitry, tuning circuitry, buffer and power amplifiers, and other components as is known in the art or otherwise disclosed herein); processing module(s) for performing signal processing (e.g., generating signals for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other conditions); and/or interface module(s) for exchanging information with other systems via other links other than a radio link. Signals transmitted by a transmitter may carry different information that, once determined by a receiver or a server, may identify the following: the transmitter that transmitted the signal; the location (LLA) of that transmitter; pressure, temperature, humidity, and other conditions at or near that transmitter; and/or other information.

A receiver may be in the form of a computing device (e.g., a mobile phone, tablet, laptop, digital camera, tracking tag). A receiver may also take the form of any component of the computing device, including a processor. By way of example, a receiver may include: antenna module(s) for exchanging signals with other systems (e.g., satellites, terrestrial transmitters, receivers); RF front end module(s) with circuitry components (e.g., mixers, filters, amplifiers, digital-to-analog and analog-to-digital converters as is known in the art or otherwise disclosed herein); processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

RELATED APPLICATIONS

This application relates to the following related application(s): U.S. Pat. Appl. No. 62/301,448, filed 29 Feb. 2016, entitled INTERFERENCE DETECTION AND REJECTION FOR WIDE AREA POSITIONING SYSTEMS; U.S. Pat. Appl. No. 62/301,456, filed 29 Feb. 2016, entitled INTERFERENCE DETECTION AND REJECTION FOR WIDE AREA POSITIONING SYSTEMS. The content of each of the related application(s) is hereby incorporated by reference herein in its entirety.

The invention claimed is:

1. A method for interference detection and mitigation, the method comprising:
 receiving, at a receiver, a plurality of positioning signals over a time period;
 generating a plurality of correlation functions by computing a correlation function for each of at least two of the received positioning signals;
 generating weighted correlation functions using weights that are related to a quality of the correlation functions, wherein generating weighted correlation functions using weights that are related to a quality of the correlation functions comprises
  (a) generating a coherently combined correlation function by coherently combining a group of correlation functions of the plurality of correlation functions,
  (b) determining a weight for the coherently combined correlation function, and
  (c) applying the determined weight to the coherently combined correlation function, wherein the number of correlation functions in the plurality of correlation functions is greater than the number of correlation functions in the group of correlation functions;
 coherently combining the weighted correlation functions;
 generating another coherently combined correlation function by coherently combining another group of correlation functions of the plurality of correlation functions;
 determining a different weight for the other coherently combined correlation function;
 applying the different determined weight to the other coherently combined correlation function; and
 estimating a time-of-arrival (TOA) of the received positioning signals using the coherently combined correlation function.

2. A method for interference detection and mitigation, the method comprising:
 receiving, at a receiver, a plurality of positioning signals over a time period;
 generating a plurality of correlation functions by computing a correlation function for each of at least two of the received positioning signals;
 generating a coherently combined correlation function by coherently combining the plurality of correlation functions, wherein coherently combining the plurality of correlation functions comprises
  (a) generating weighted correlation functions using weights that are related to a quality of the correlation functions, and
  (b) coherently combining the weighted correlation functions,
  wherein generating weighted correlation functions using weights that are related to a quality of the correlation functions comprises
   i) determining a weight for each correlation function of the plurality of correlation functions, and
   (ii) applying, to each correlation function of the plurality of correlation functions, the weight determined for that correlation function,
    wherein determining a weight for each correlation function of the plurality of correlation functions comprises identifying a peak side-lobe value of the correlation function identifying a peak main-lobe value of the correlation function computing, using the peak side-lobe value and the peak main-lobe value, a main-lobe to peak side-lobe ratio (MPSR), and using the MPSR to determine the weight; and
 estimating a time-of-arrival (TOA) of the received positioning signals using the coherently combined correlation function.

3. A method for interference detection and mitigation, the method comprising:
 receiving, at a receiver, a plurality of positioning signals over a time period;
 generating a plurality of correlation functions by computing a correlation function for each of at least two of the received positioning signals;

generating a coherently combined correlation function by coherently combining the plurality of correlation functions; and estimating a time-of-arrival (TOA) of the received positioning signals using the coherently combined correlation function;

estimating a pseudorange using the estimated TOA;

determining an interference presence metric, wherein the interference presence metric is determined using one or more of the plurality of correlation functions;

determining a pseudorange weight using the interference presence metric;

weighting the estimated pseudorange using the pseudorange weight; and generating, using the weighted pseudorange, an estimated position of the receiver.

4. The method of claim 3, wherein determining an interference presence metric comprises:

determining a plurality of SNR values by determining an SNR value for each correlation function of the plurality of correlation functions;

identifying a minimum SNR from among the plurality of determined SNR values;

identifying a maximum SNR from among the plurality of determined SNR values;

determining a SNR difference by subtracting the minimum SNR from the maximum SNR;

determining a scale factor; and determining the interference presence metric, wherein the interference metric is determined by the SNR difference and the scale factor.

5. The method of claim 4, wherein determining a scale factor comprises:

collecting positioning data from multiple locations;

calculating a plurality of position error statistics using the positioning data and a plurality of initial scale factors, wherein each position error statistic of the plurality of position error statistics is determined using an initial scale factor of the plurality of initial scale factors;

identifying, from the plurality of position error statistics, the minimum position error statistic;

identifying, from the plurality of initial scale factors, the initial scale factor used to determine the minimum position error statistic; and using the identified initial scale factor as the scale factor.

6. The method of claim 1, wherein the weights are proportional to the quality of the correlation functions.

7. The method of claim 2, wherein the weights are proportional to the quality of the correlation functions.

8. The method of claim 1, wherein generating a plurality of correlation functions by computing a correlation function for each of at least two of the received positioning signals comprises:

generating, for a first received positioning signal of the received positioning signals, a first correlation function of the plurality of correlation functions, wherein the first correlation function is generated by correlating the first received positioning signal with a locally-generated copy of a transmitted sequence.

9. The method of claim 2, wherein generating a plurality of correlation functions by computing a correlation function for each of at least two of the received positioning signals comprises:

generating, for a first received positioning signal of the received positioning signals, a first correlation function of the plurality of correlation functions, wherein the first correlation function is generated by correlating the first received positioning signal with a locally-generated copy of a transmitted sequence.

10. The method of claim 3, wherein generating a plurality of correlation functions by computing a correlation function for each of at least two of the received positioning signals comprises:

generating, for a first received positioning signal of the received positioning signals, a first correlation function of the plurality of correlation functions, wherein the first correlation function is generated by correlating the first received positioning signal with a locally-generated copy of a transmitted sequence.

11. One or more non-transitory machine-readable media embodying program instructions that, when executed by one or more machines, cause the one or more machines to perform a method for interference detection and mitigation, the method comprising:

receiving, at a receiver, a plurality of positioning signals over a time period;

generating a plurality of correlation functions by computing a correlation function for each of at least two of the received positioning signals;

generating weighted correlation functions using weights that are related to a quality of the correlation functions, wherein generating weighted correlation functions using weights that are related to a quality of the correlation functions comprises (a) generating a coherently combined correlation function by coherently combining a group of correlation functions of the plurality of correlation functions, (b) determining a weight for the coherently combined correlation function, and (c) applying the determined weight to the coherently combined correlation function, wherein the number of correlation functions in the plurality of correlation functions is greater than the number of correlation functions in the group of correlation functions;

coherently combining the weighted correlation functions;

generating another coherently combined correlation function by coherently combining another group of correlation functions of the plurality of correlation functions;

determining a different weight for the other coherently combined correlation function;

applying the different determined weight to the other coherently combined correlation function; and estimating a time-of-arrival (TOA) of the received positioning signals using the coherently combined correlation function.

12. The one or more non-transitory machine-readable media of claim 11, wherein the weights are proportional to the quality of the correlation functions.

13. The one or more non-transitory machine-readable media of claim 11, wherein generating a plurality of correlation functions by computing a correlation function for each of at least two of the received positioning signals comprises:

generating, for a first received positioning signal of the received positioning signals, a first correlation function of the plurality of correlation functions, wherein the first correlation function is generated by correlating the first received positioning signal with a locally-generated copy of a transmitted sequence.

14. One or more non-transitory machine-readable media embodying program instructions that, when executed by one or more machines, cause the one or more machines to perform a method for interference detection and mitigation, the method comprising:

receiving, at a receiver, a plurality of positioning signals over a time period;

generating a plurality of correlation functions by computing a correlation function for each of at least two of the received positioning signals;

generating a coherently combined correlation function by coherently combining the plurality of correlation functions, wherein coherently combining the plurality of correlation functions comprises (a) generating weighted correlation functions using weights that are related to a quality of the correlation functions, and (b) coherently combining the weighted correlation functions, wherein generating weighted correlation functions using weights that are related to a quality of the correlation functions comprises (i) determining a weight for each correlation function of the plurality of correlation functions, and (ii) applying, to each correlation function of the plurality of correlation functions, the weight determined for that correlation function, wherein determining a weight for each correlation function of the plurality of correlation functions comprises identifying a peak side-lobe value of the correlation function, identifying a peak main-lobe value of the correlation function, computing, using the peak side-lobe value and the peak main-lobe value, a main-lobe to peak side-lobe ratio (MPSR), and using the MPSR to determine the weight; and estimating a time-of-arrival (TOA) of the received positioning signals using the coherently combined correlation function.

15. The one or more non-transitory machine-readable media of claim 14, wherein the weights are proportional to the quality of the correlation functions.

16. The one or more non-transitory machine-readable media of claim 14, wherein generating a plurality of correlation functions by computing a correlation function for each of at least two of the received positioning signals comprises:

generating, for a first received positioning signal of the received positioning signals, a first correlation function of the plurality of correlation functions, wherein the first correlation function is generated by correlating the first received positioning signal with a locally-generated copy of a transmitted sequence.

17. One or more non-transitory machine-readable media embodying program instructions that, when executed by one or more machines, cause the one or more machines to perform a method for interference detection and mitigation, the method comprising:

receiving, at a receiver, a plurality of positioning signals over a time period;

generating a plurality of correlation functions by computing a correlation function for each of at least two of the received positioning signals;

generating a coherently combined correlation function by coherently combining the plurality of correlation functions; and estimating a time-of-arrival (TOA) of the received positioning signals using the coherently combined correlation function;

estimating a pseudorange using the estimated TOA;

determining an interference presence metric, wherein the interference presence metric is determined using one or more of the plurality of correlation functions;

determining a pseudorange weight using the interference presence metric;

weighting the estimated pseudorange using the pseudorange weight; and generating, using the weighted pseudorange, an estimated position of the receiver.

18. The one or more non-transitory machine-readable media of claim 17, wherein determining an interference presence metric comprises:

determining a plurality of SNR values by determining an SNR value for each correlation function of the plurality of correlation functions;

identifying a minimum SNR from among the plurality of determined SNR values;

identifying a maximum SNR from among the plurality of determined SNR values;

determining a SNR difference by subtracting the minimum SNR from the maximum SNR;

determining a scale factor; and determining the interference presence metric, wherein the interference metric is determined by the SNR difference and the scale factor.

19. The one or more non-transitory machine-readable media of claim 18, wherein determining a scale factor comprises:

collecting positioning data from multiple locations;

calculating a plurality of position error statistics using the positioning data and a plurality of initial scale factors, wherein each position error statistic of the plurality of position error statistics is determined using an initial scale factor of the plurality of initial scale factors;

identifying, from the plurality of position error statistics, the minimum position error statistic;

identifying, from the plurality of initial scale factors, the initial scale factor used to determine the minimum position error statistic; and using the identified initial scale factor as the scale factor.

20. The one or more non-transitory machine-readable media of claim 17, wherein generating a plurality of correlation functions by computing a correlation function for each of at least two of the received positioning signals comprises:

generating, for a first received positioning signal of the received positioning signals, a first correlation function of the plurality of correlation functions, wherein the first correlation function is generated by correlating the first received positioning signal with a locally-generated copy of a transmitted sequence.

* * * * *